(12) United States Patent
Sawaragi et al.

(10) Patent No.: US 6,177,138 B1
(45) Date of Patent: Jan. 23, 2001

(54) ABRASION-RESISTANT COATING COMPOSITION FOR ACRYLIC RESIN MOLDED ARTICLE

(75) Inventors: Fujio Sawaragi; Hizashi Sonezaki, both of Ichihara (JP)

(73) Assignee: Nippon ARC Co., Ltd., Chiba (JP)

( * ) Notice: Under 35 U.S.C. 154(b), the term of this patent shall be extended for 0 days.

(21) Appl. No.: 09/414,961

(22) Filed: Oct. 12, 1999

Related U.S. Application Data

(63) Continuation of application No. PCT/JP99/00578, filed on Feb. 10, 1999.

(30) Foreign Application Priority Data

Feb. 13, 1998 (JP) .................................................. 10-031385

(51) Int. Cl.[7] .................................. B05D 3/02; B05D 7/02
(52) U.S. Cl. ........................................ 427/387; 427/393.5
(58) Field of Search .................................. 427/393.5, 387

(56) References Cited

U.S. PATENT DOCUMENTS 4,211,823 * 7/1980 Suzuki et al. ......................... 427/164
5,108,791 * 4/1992 Chung et al. ........................ 427/208.8

FOREIGN PATENT DOCUMENTS

| 0 510 608 | 10/1992 | (EP) . |
| 59-108064 | 6/1984 | (JP) . |
| 61-108636 | * 5/1986 | (JP) . |
| 4-213338 | 8/1992 | (JP) . |
| 5-331304 | 12/1993 | (JP) . |
| 5-345878 | 12/1993 | (JP) . |
| 7-166066 | 6/1995 | (JP) . |
| 8-238683 | 9/1996 | (JP) . |

* cited by examiner

Primary Examiner—Erma Cameron
(74) Attorney, Agent, or Firm—Wenderoth, Lind & Ponack, L.L.P.

(57) ABSTRACT

There is provided a coating composition for the formation of a hard coat having sufficient adhesivity to acrylic resin molded articles. A hard coat obtained by dispersing and dissolving a (partial) hydrolyzate of an organofunctional silane and colloidal silica in a benzyl alcohol solvent is coated on an acrylic resin molded article produced by cell casting or continuous casting to obtain an abrasion-resistant molded article.

10 Claims, No Drawings

ABRASION-RESISTANT COATING COMPOSITION FOR ACRYLIC RESIN MOLDED ARTICLE

This is continuation of PCT/JP99/00578, filed Feb. 10, 1999.

TECHNICAL FIELD

The present invention relates to an abrasion-resistant coating composition for an acrylic resin molded article and to a coating method using the composition. More particularly, the present invention relates to a coating composition used for forming a hard coat layer on the surface of an acrylic resin molded article and to a coating method.

PRIOR ART

The hard coat treatment of the surface of a plastic has been conducted, for example, by the methods disclosed in the following Laid-Open Patent Publications.

JP-A 59-108064 discloses a hard coat solution for forming a hard coat layer on the surface of an acrylic resin molded article, which comprises the following components (a) to (d):

(a) a hydrolyzate and/or a partial hydrolyzate of a silicon-containing compound having the following structural formula:

$$R_n Si(OR')_m$$

wherein R is an organic group having 1 to 9 carbon atoms, R' is an alkyl group having 1 to 3 carbon atoms, n is 1 to 3, and m is 3 to 1;

(b) colloidal silica using water and/or alcohol as a dispersion medium;

(c) colloidal antimony oxide using water and/or alcohol as a dispersion medium; and (d) a lower aliphatic alcohol for dissolving the above components (a) to (c).

The hard coat solution having the above composition is coated on a plastic such as a plastic lens and heat-cured to prevent the surface of the plastic from being abraded.

JP-A 8-238683 discloses a hard coating agent comprising a particular silane compound and/or a hydrolyzate thereof, surface-modified titanium oxide fine particles and aluminum perchlorate. It is emphasized in the publication that aluminum perchlorate is a curing catalyst which is essential to prevent the appearance of interference fringes and the whitening of a formed film because such prevention is not attained by any known curing catalyst.

Meanwhile, the following four molding methods are known for the production of an acrylic resin molded article. The acrylic resin molded articles produced by these molding methods differ from each other in their adhesivity to a hard coat layer formed thereon.

| Molding methods | Adhesivity to hard coat |
| --- | --- |
| (1) Extrusion-molded article | Good |
| (2) Injection-molded article | Good |
| (3) Cell-casting-molded article | Poor |
| (4) Continuous-casting molded article | Poor |

In the molded articles (1) and (2), resins used as raw materials must have a relatively low molecular weight because they are melted in molding. When the hard coat solution contains a lower aliphatic alcohol such as ethanol or isopropyl alcohol, the molded articles (1) and (2) undergo appropriate etching by the lower aliphatic alcohol, giving rise to adhesivity between the molded article and the hard coat.

Meanwhile, the molded articles (3) and (4) are different from the molded articles (1) and (2) in that they gives rise to a polymerization reaction during molding. Although it is not known whether or not this is connected with the above-mentioned polymerization reaction of raw material acrylic resin, none of conventional hard coat solutions has shown sufficient adhesivity to cell-casting-molded or continuous-casting-molded articles of an acrylic resin.

DISCLOSURE OF THE INVENTION

It is an object of the present invention to provide an abrasion-resistant coating composition for an acrylic resin molded article.

It is another object of the present invention to provide an abrasion-resistant coating composition showing sufficient adhesivity to molded articles produced by any molding method.

It is still another object of the present invention to provide a method for coating an acrylic resin molded article using the above coating composition of the present invention.

Still other objects and advantages of the present invention will become apparent from the following description.

According to the present invention, firstly, the above objects and advantages of the present invention are achieved by an abrasion-resistant coating composition for an acrylic resin molded article, comprising:

(A) at least one kind of a silicon compound selected from the group consisting of organic silicon compounds represented by the following formula (1):

$$R^1 R^2_a Si(OR^3)_{3-a} \qquad (1)$$

wherein $R^1$ is an alkyl group, an alkenyl group, a halogenoalkyl group, an aryl group, an aralkyl group or a halogenoaryl group; $R^2$ is an alkyl group, an alkenyl group, a halogenoalkyl group, an aryl group, an aralkyl group or an alkyl group having epoxy group, amino group, mercapto group, methacryloxy group or acryloxy group; $R^3$ is a hydrogen atom, an alkyl group or an acyl group; and a is 0 or 1, and partial hydrolyzates thereof, (B) a dispersion sol of metal oxide fine particles, (C) a curing agent, and (D) benzyl alcohol.

The above objects and advantages of the present invention are achieved, secondly, by a process for producing an acrylic resin molded article having an abrasion-resistant coating film thereon, which comprises applying the coating composition of the present invention on at least part of the surface of the acrylic resin molded article and then drying and curing the formed wet film.

DETAILED DESCRIPTION OF THE INVENTION

The base material for the coating composition of the present invention may be any acrylic resin or flame-retardant acrylic resin molded article obtained by injection molding, cell-casting molding or continuous-casting molding.

The thickness in which the coating composition is coated on the above molded article is preferably 1 to 8 μm in terms of solid content. The coating film formed is cured preferably under the conditions of 70 to 90° C. for 0.5 to four hours. The coating composition can be coated on the above molded article, for example, by flow coating, dip coating, spray coating, spin coating, roller coating or curtain flow coating.

The coating composition of the present invention shows sufficient adhesivity not only to cell-casting- or continuous-casting-molded articles but also to extrusion- or injection-molded articles. Further, the coating composition also shows good adhesivity to colored acrylic resin molded articles. Moreover, the coating composition also shows good adhesivity to all of the flame-retardant-containing acrylic resin molded articles produced by each of the four production methods mentioned above.

As the flame-retardant, there can be mentioned, for example, halogen-based, phosphorus-based or inorganic flame-retardants; and flame-retardants of phosphates, haloalkyl phosphates or their polyphosphates. Of these, preferred are flame-retardants of phosphate type, haloalkyl phosphate type or their polyphosphate type because they can maintain the transparency of an acrylic resin molded article.

As specific examples of the flame-retardant, there can be mentioned halogen-based flame-retardants such as tetrabromobisphenol A, 2,2-bis(4-hydroxy-3,5-dibromophenyl) propane and the like; phosphorus-based flame-retardants such as tricresyl phosphate, trischloroethyl phosphate and polyphosphate thereof; and inorganic flame-retardants such as antimony trioxide, zirconium hydroxide, barium metaborate, tin oxide and the like.

The base material consisting of an acrylic resin molded article in the present invention is a polymer composed mainly of methyl methacrylate. As its copolymer component (s), there can be mentioned acrylic acid esters, acrylic acid, acrylonitrile, etc. The base material used in the present invention also includes those containing an acrylic rubber or a butadiene rubber or those containing a crosslinking agent.

Next, description is given on the individual components constituting the coating composition of the present invention.

Firstly, as the component (A), there is used at least one compound selected from the group consisting of organic silicon compounds represented by the following formula (1) and partial hydrolyzates thereof.

$$R^1R^2_a Si(OR^3)_{3-a} \tag{1}$$

wherein $R^1$ is an alkyl group, an alkenyl group, a halogenoalkyl group, an aryl group, an aralkyl group or a halogenoaryl group; $R^2$ is an alkyl group, an alkenyl group, a halogenoalkyl group, an aryl group, an aralkyl group or an alkyl group having epoxy group, amino group, mercapto group, methacryloxy group or acryloxy group; $R^3$ is a hydrogen atom, an alkyl group or an acyl group; and a is zero or one.

a is preferably zero in order to obtain a coating film having a high hardness.

The alkyl group of $R^1$ is preferably an alkyl group having one to six carbon atoms and can be a straight chain, a branched chain or a ring. As the alkyl group of $R^1$, there can be mentioned, for example, methyl, ethyl, propyl, butyl, pentyl, hexyl and cyclohexyl.

The alkenyl group of $R^1$ is preferably an alkenyl group having two to 10 carbon atoms and may contain an aromatic ring therein. As the alkenyl group of $R^1$, there can be mentioned, for example, vinyl, allyl, 9-decenyl, p-vinylbenzyl and isopropenyl.

The halogenoalkyl group of $R^1$ is preferably a halogenoalkyl group having two to 15 carbon atoms and can be a straight chain or a branched chain.

As the halogen atom, there can be mentioned fluorine, chlorine and bromine.

As the halogenoalkyl group, there can be mentioned, for example, 3-chloropropenyl, 3,3,3-trifluoropropenyl, 3,3,4,4, 5,5,6,6,6-nonafluorohexyl and perfluorooctyl-ethyl-.

The aryl group of $R^1$ is preferably an aryl group having six to 15 carbon atoms. As the aryl group, there can be mentioned, for example, phenyl, tolyl and naphthyl.

The aralkyl group of $R^1$ is preferably an aralkyl group having seven to 10 carbon atoms. As the aralkyl group, there can be mentioned, for example, benzyl and phenethyl.

The halogenoaryl group of $R^1$ is preferably a halogenoaryl group having six to 12 carbon atoms. As the halogen atom, there can be mentioned fluorine, chlorine and bromine. As the halogenoaryl group, there can be mentioned, for example, p-700 phenyl.

The alkyl group of R is preferably an alkyl group having one to 12 carbon atoms and can be a straight chain, a branched chain or a ring. As such an alkyl group, there can be mentioned, for example, methyl, ethyl, propyl, butyl, pentyl, hexyl, cyclohexyl and decyl.

The alkenyl group of $R^2$ is preferably an alkenyl group having two to 10 carbon atoms and may contain an aromatic ring therein. As such an alkenyl group, there can be mentioned, for example, vinyl, allyl, 9-decel, p-vinylbenzyl and isopropenyl.

The halogenoalkyl group of $R^2$ is preferably an halogenoalkyl group having two to 15 carbon atoms and can be a straight chain or a branched chain. As the halogen atom, there can be mentioned fluorine, chlorine and bromine. As the halogenoalkyl group, there can be mentioned, for example, 3-chloropropenyl, 3,3,3-trifluoropropenyl, and 3,3, 4,4,5,5,6,6,6-nonafluorohexyl.

The aryl group of $R^2$ is preferably an aryl group having six to 15 carbon atoms. As such an aryl group, there can be mentioned, for example, phenyl, tolyl and naphthyl.

The aralkyl group of $R^2$ is preferably an aralkyl group having 7 to 10 carbon atoms. As such an aralkyl group, there can be mentioned, for example, benzyl and phenethyl.

As the epoxy group-containing alkyl group of $R^2$, there can be mentioned, for example, γ-glycidoxypropyl, β-glycidoxypropyl and β-(3,4-epoxycyclohexyl)ethyl.

As the amino group-containing alkyl group of $R^2$, there can be mentioned, for example, γ-aminopropyl and (β-aminoethyl)-γ-aminopropyl.

As the mercapto group-containing alkyl group of $R^2$, there can be mentioned, for example, γ-mercaptopropyl and p-mercaptomethylphenylethyl.

As the methacryloxy or acryloxy group-containing alkyl group of $R^2$, there can be mentioned, for example, methacryloxypropyl and γ- acryloxypropyl.

The alkyl group of $R^3$ is preferably an alkyl group having one to three carbon atoms and can be a straight chain, a branched chain or a ring. As such an alkyl group, there can be mentioned, for example, methyl, ethyl, propyl and butyl.

The acyl group of $R^3$ is preferably an acyl group having two to four carbon atoms. As such an acyl group, there can be mentioned, for example, acetyl, propionyl and butyryl.

As specific examples of the above silicon compound, the following compounds can be mentioned. That is, trialkoxy group- or triacyloxy group-containing compounds such as methyltripropoxysilane, methyltriisopropoxysilane, methyltributoxysilane, methyltrimethoxysilane, methyltriethoxysilane, methyltriacetoxysilane, ethyltripropoxysilane, ethyltrtisopropoxysilane, ethyltributoxysilane, ethyltrimethoxysilane, ethyltriethoxysilane, phenyltrimethoxysilane, phenyltriethoxysilane, phenyltriacetoxysilane, vinyltrimethoxysilane, vinyltriethoxysilane, vinyltriacetoxysilane, vinyltriisopropoxysilane, γ-acryloxypropyltrimethoxysilane, γ-chloropropyltrimethoxysilane, γ-chloropropyltriethoxysilane, γ-chloropropyltripropoxysilane, 3,3,3-fluoropropyltrimethoxysilane, γ-methacryloxypropyltrimethoxysilane, γ-mercaptopropyltrimethoxysilane, γ-mercaptopropyltriethoxysilane, N-β-(aminoethyl)-γ-aminopropyltrimethoxysilane, γ-aminopropyltrimethoxysilane, γ-aminopropyltriethoxysilane, γ-glycidoxypropyltrimethoxysilane, γ-glycidoxypropyltriethoxysilane, γ-glycidoxypropyltriisopropoxysilane, γ-(β-glycidoxyethoxy)propyltriethoxysilane, β-glycidoxypropyltrimethoxysilane, β-glycldoxypropyltriethoxysilane and the like; and dialkoxy group- or diacyloxy group-containing compounds such as dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropylmethyldimethoxysilane, γ-mercaptopropylmethyldimethoxysilane, γ-mercaptopropylmethyldiethoxysilane, N-β-(aminoethyl)-γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethyldiisopropoxysilane; γ-chloropropylmethyldimethoxysilane, γ-chloropropylmethyldiethoxysilane, dimethyldiacetoxysilane, β-(3,4-epoxycyclohexyl)ethylmethyldimethoxysilane, methylvinyldimethoxysilane, methylvinyldiethoxysilane and the like.

As the dispersion sol of metal oxide fine particles which is the component (B), colloidal metal oxide fine particles can be used.

The metal component is preferably at least one kind selected from Si, Ti, Ce, Fe, Sn, Zr, Al, W, Sb, Ta, La and In.

That is, as the metal oxide fine particles, there can be mentioned fine particles of an oxide of one of these metal components, fine particles of a compound oxide of two or more kinds of these metal components, a mixture of fine particles of one metal oxide with fine particles of other metal oxide, and a mixture of fine particles of one metal oxide with fine particles of a compound oxide of two or more metals. The above dispersion sol is a sol obtained by dispersing the metal oxide fine particles in water or other solvent.

The metal oxide fine particles have an average particle diameter of desirably 1 to 100 nm. Particles having an average particle diameter of smaller than 1 nm are substantially impossible to produce. When the averages particle diameter is larger than 100 nm, the resulting coating film has a low transparency.

In the present invention,, the dispersion sol is most typically a colloidal silica. For example, as a $SiO_2$ dispersion sol, the following compounds can be used.

(1) Snowtex O-40, a trade name of a product of Nissan Chemical Industries, Ltd., which is an aqueous dispersion sol having an average particle diameter of 20 nm and a solid content of 40%.

(2) IPA-ST, a trade name of a product of Nissan Chemical Industries, Ltd., which is an isopropyl alcohol dispersion sol having an average particle diameter of 20 nm and a solid content of 30%.

The metal oxide fine particles or compound metal oxide fine particles used in the above sol of metal oxide fine particles can have improved reactivity or affinity with the silicon-containing compound, which is a matrix, by subjecting them to a surface treatment with an organic silicon compound.

As the organic silicon compound used for the surface treatment of the metal oxide fine particles, there can be used a monofunctional silane represented by $R_3SiX$ (wherein R is an alkyl group, a phenyl group, a vinyl group, or an organic group having a methacryloxy group, mercapto group, amino group or epoxy group; and X is a hydrolyzable group), and a tetrafunctional silane represented by $SiX_4$; for example, tetraethyl orthosilicate and tetramethyl orthosillcate.

There can also be used metal dispersion sols other than colloidal silica, such as the followings.

A metal oxide sol containing $Sb_2O_5$ (e.g. a methanol dispersion sol having a solid content of 30% by weight), a compound metal oxide sol containing $TiO_2$—$Fe_2O_3$—$SiO_2$ (e.g. a methanol dispersion sol having a solid content of 30% by weight), a compound metal oxide sol containing $TiO_2$—$CeO_2$—$SiO_2$ (e.g. a methanol dispersion sol having a solid content of 30% by weight), a compound metal oxide sol containing $SnO_2$—$WO_3$ (e.g. a methanol dispersion sol having a solid content of 30% by weight), and a metal oxide sol containing $Al_2O_3$ (e.g. an aqueous dispersion sol having a solid content of 10% by weight).

As the curing agent which is the component (C), there can be used, for example, the following compounds.

Alkali metal salts or ammonium salts of carboxylic acids, metal salts of acetylacetone, metal salts of ethyl acetoacetate, metal salts in which acetylacetone is and ethyl acetoacetate coordinate, diamides, organic sulfonic acids and their amine salts, magnesium perchlorate, ammonium perchlorate, and primary to tertiary amines.

There can also be used disodium calcium, disodium magnesium, disodium manganese, disodium cobalt, disodium nickel, disodium copper, disodium zinc, monosodium iron or bismuth salt of ethylenediaminetetraacetic acid.

The benzyl alcohol, which is the component (D) of the present invention, is used in an amount of preferably 2 to 35 parts by weight, more preferably 6 to 35 parts by weight per 100 parts by weight of the total components. When the amount of benzyl alcohol is too small, the coating film obtained from the coating composition of the present invention has low adhesivity to acrylic resin molded articles. When the amount is too large, the coating film causes whitening and/or cracking.

When methyl isobutyl ketone is used in place of benzyl alcohol, the adhesivity of the coating film to the acrylic resin molded articles is lower than that when benzyl alcohol is used. Benzyl alcohol increases the adhesivity uniquely.

The coating composition of the present invention can further contain (E) a medium other than benzyl alcohol. Such a medium dissolves or disperses the components (A), (B) and (C).

As the medium for the component (E), there can be used the following compounds.

They are alcohols such as methanol, ethanol, isopropyl alcohol, n-butanol, 2-butanol and the like; glycol ether alcohols such as methyl cellosolve, ethyl cellosolve, propyl cellosolve, butyl cellosolve, ethylene glycol, propylene glycol monomethyl ether and the like; methyl acetate and ethyl acetate; ketones such as acetone, methyl ethyl ketone, methyl isobutyl ketone and the like; and so forth.

In the coating composition of the present invention, the desired proportions of the individual components are as follows.

The weight ratio of the component (A) to the component (B) is preferably 8/2 to 3/7, more preferably 7/3 to 4/6.

The total weight of the component (A) and the component (B) is preferably 5 to 70 parts by weight, more preferably 10 to 40 parts by weight per 100 parts by weight of the coating composition.

When the amount of the component (A) is too large, the coating film formed has a low hardness. When the amount of the component (A) is too small, the coating film is fragile. When the amount of the component (B) is too large, the coating film is fragile. When the amount of the component (B) is too small, the coating film has a low hardness. When the total amount of the component (A) and the component (B) is too large, the coating film tends to have cracking. When the total amount is too small, the coating film has too small a thickness and accordingly a low hardness.

The amount of the component (C) is preferably 0.3 to 10 parts by weight, more preferably 0.6 to 3.0 parts by weight per 100 parts by weight of the total solid content of the component (A) and the component (B).

The amount of the optional component (E) is preferably 1 to 89 parts by weight, more preferably 6 to 60 parts by weight per 100 parts by weight of the coating composition.

When the amount of the component (C) is too large, the coating film is fragile. When the amount of the component (C) is too small, the coating film has a low hardness. When the amount of the component (E) is too large, the coating film is too low in solid content, so that no appropriate hardness of the coating film is obtained. When the amount of the component (E) is too small, the coating film is too high in solid content and too large in thickness and generates cracking. As mentioned above, when the amount of the component (D) is too large, the coating film has no appropriate hardness and the base material on which the coating film has been formed is liable to generate cracking and/or whitening, while when the amount of the component (D) is too small, the coating film has no sufficient adhesivity to the molded article.

To the abrasion-resistant coating composition of the present invention may further be added the following substances.

A copolymer of a polyoxyalkylene and a polydimethylsiloxane or a copolymer of a fluoroalkyl, a perfluoroalkyl and a polyoxyalkylene may be added as a leveling agent in an amount of 0.002 to 1 part by weight per 100 parts by weight of the hard coat solution.

The coating composition of the present invention may contain the water required for the hydrolysis of the component (A). as the water associated with the component (B), (C) or (D). A typical case is when the dispersion sol of metal oxide fine particles is an aqueous dispersion sol.

The coating composition of the present invention may further contain, for hydrolysis, an acid catalyst and water.

There are used, for example, 1/100 to 1/2 N hydrochloric acid, 1 to 10% by weight of acetic acid based on the component (A), and 0.5 to 5 moles of water per mole of the component (A).

According to the present invention, by using the coating composition, an abrasion-resistant coating film can be formed on an acrylic resin molded article as follows. That is, a process for producing an acrylic resin molded article having an abrasion-resistant film thereon, which comprises applying the coating composition of the present invention on at least part of the surface of an acrylic resin molded article and then drying and curing the formed wet film.

When the coating composition of the present invention is used to form a hard coat layer on the surface of an acrylic resin molded article, it shows sufficient adhesivity to a cell-casting or continuous-casting-molded article, to which no sufficient adhesivity has hitherto been obtained without using a primer, when coated directly on the article.

Thus, it has become possible to impart, without using any primer, abrasion resistance onto a cell-casting- or continuous casting-molded article made of an acrylic resin to which the adhesion of hard coat has been impossible.

This has been made possible by using, in the present invention, an appropriate amount of benzyl alcohol to allow the benzyl alcohol to exhibit appropriate etching to the molded article base material. Excessive etching causes the whitening and cracking of the molded article.

The present coating composition forms a hard coat layer superior in abrasion resistance when coated on the molded article base material and cured and causes neither whitening nor cracking of molded article when coated on an extrusion-molded article.

Benzyl alcohol, the component (D), has a boiling point higher than the thermal deformation temperature (about 80° C.) of acrylic resin molded articles. However, having azeotropy with the component (E), benzyl alcohol is vaporized together with the component (E) in the film drying step conducted after the coating of the present composition on an acrylic resin molded article, does not substantially remain in the dried film, and does not reduce the anti-abrasion property (Taber abrasion hardness) of the film.

The example of the present invention will be described.

EXAMPLE

There was placed 236 g of methyltrimethoxysilane in a flask equipped with a cooler. While the flask contents were stirred in a cooled condition, 56 g of a 1/20 N aqueous HCl solution was gradually added thereto. The mixture was stirred at a temperature of 10° C. or lower for 20 hours.

Next, while the mixture was stirred, 259 g of an isopropanol-dispersed colloidal silica containing 30% of $SiO_2$ was added thereto. Successively, 30 g of acetic acid, 110 g of benzyl alcohol and 298 g of isopropanol were added, and 10 g of aluminum acetylacetonate was also added as a curing agent. The mixture was stirred for 30 minutes. One gram of an isopropanol solution containing 10% of FC-430 (a fluorine-based surfactant produced by 3M) was added as a leveling agent. The mixture was stirred for 10 minutes.

Comparative Example 1

There was placed 236 g of methyltrimethoxysilane in a flask equipped with a cooler. While the flask contents were stirred in a cooled state, 56 g of a 1/20 N aqueous HCl solution was gradually added thereto. The mixture was stirred at a temperature of 10° C. or lower for 20 hours.

Next, while the mixture was stirred, 259 g of an isopropanol-dispersed colloidal silica containing 30% of $SiO_2$ was added thereto. Successively, 30 g of acetic acid and 408 g of isopropanol were added, and 10 g of aluminum acetylacetonate was also added as a curing agent. The mixture was stirred for 30 minutes. One gram of an isopropanol solution containing 10% of FC-430 (a fluorine-based surfactant produced by 3M) was added as a leveling agent. The mixture was stirred for 10 minutes.

Comparative Example 2

There was placed 236 g of methyltrimethoxysilane in a flask equipped with a cooler. While the flask contents were stirred in a cooled state, 56 g of a 1/20 N aqueous HCl solution was gradually added thereto. The mixture was stirred at a temperature of 10° C. or lower for 20 hours.

Next, while the mixture was stirred, 259 g of an isopropanol-dispersed colloidal silica containing 30% of $SiO_2$ was added thereto. Successively, 30 g of acetic acid and 408 g of benzyl alcohol were added, and 10 g of aluminum acetylacetonate was also added as a curing agent. The mixture was stirred for 30 minutes. One gram of an isopropanol solution containing 10% of FC-430 (a fluorine-based surfactant produced by 3M) was added as a leveling agent. The mixture was stirred for 10 minutes.

Each of the hard coat solutions produced in Example and Comparative Examples 1 and 2 was coated on an acrylic plate of 100 mm×200 mm×8 mm (length×width×thickness) molded by each of extrusion, cell casting or continuous casting and then cured at 85° C. for 2 hours.

Base Material
- a: An extrusion-molded article, "Sumipex E", a product of Sumitomo Chemical Company, Ltd.
- b: A cell-casting-molded article, "Acrylite S", a product of Mitsubishi Rayon Co., Ltd.
- c: A continuous-casting-molded article, "Acryllte L", a product of Mitsubishi Rayon Co., Ltd.
- d: A flame-retardant cell-casting-molded article 1, "Acrylite FR 11", a product of Mitsubishi Rayon Co., Ltd.
- e: A flame-retardant cell-casting-molded article 2, "Sumipex FR", a product of Sumitomo Chemical Company, Ltd.

TABLE 1

| test piece | hard coat solution | base material | coating method | film thickness (μm) | appearance of coating | crosshatch test (% adhesion) | taber-abrasion test (delta haze %) |
|---|---|---|---|---|---|---|---|
| 1 | Example | a | (1) | 5 | good | 100 | 5 |
| 2 | Example | b | (2) | 4 | good | 100 | 6 |
| 3 | Example | c | (2) | 4 | good | 100 | 6 |
| 4 | Example | d | (1) | 5 | good | 100 | 5 |
| 5 | Example | e | (1) | 5 | good | 100 | 5 |
| 6 | Comp. Ex. 1 | b | (1) | 5 | good | 0 | 10 |
| 7 | Comp. Ex. 1 | d | (2) | 4 | good | 0 | 12 |
| 8 | Comp. Ex. 2 | a | (1) | 3.5 | whitening | 100 | impossible to measure |
| 9 | Comp. Ex. 2 | c | (2) | 3 | cracking | 100 | impossible to measure |
| 10 | Comp. Ex. 2 | e | (1) | 3.5 | cracking | 100 | impossible to measure |

Comp. Ex.: Comparative Example

Coating Method
- (1): flow coating method; that is, with an acrylic plate suspended vertically, a coating solution in a washing bottle was flow-coated on the plate.
- (2): dip coating method; that is, an acrylic resin plate was suspended vertically, immersed in a coating solution for 60 seconds and pulled up at a speed of 150 cm/min.

The thickness of the film was measured using a surface roughness tester, and a crosshatch test was conducted using a Nichiban CT-12 tape (a cellophane tape produced by Nichiban Co., Ltd.).

A Taber abrasion test was conducted by rotating an abrasive wheel CS10F 500 times under a load of 500 g, applying a straight light thereon and measuring a change in light diffusion before and after the abrasion test as a delta haze using a haze meter.

delta haze (%)=[haze (%) of sample after test]−[haze (%) of sample before test]

As is clear from the results of Table 1, the coating composition for forming the hard coat layer, produced in Example of the present invention, showed sufficient adhesivity when coated directly on a cell-casting-molded article and a continuous-casting-molded article; and the obtained hard coat layer was superior in abrasion resistance. Further, the composition caused neither whitening nor cracking of a molded article when coated on an extrusion-molded article. Meanwhile, the coating composition containing no benzyl alcohol as a solvent, produced in Comparative Example 1, gave an inferior result in the cross-cut test and is low in adhesivity to base material. The coating composition containing benzyl alcohol in too large an amount, produced in Comparative Example 2, caused whitening and cracking of the coating film. That is, if the amount of benzyl alcohol is too large, the acrylic base material has whitening and cracking.

The coating composition of the present invention for forming a hard coat layer shows sufficient adhesivity when coated directly on a cell-casting-molded article and a continuous-casting-molded article; and the obtained hard coat layer is superior in abrasion resistance. The composition causes neither whitening nor cracking of a molded article when coated on an extrusion-molded article.

What is claimed is:

1. An abrasion-resistant coating composition for a molded article of acrylic resin comprising:

(A) at least one kind of a silicon compound selected from the group consisting of organic silicon compounds represented by the following formula (1):

$$R^1Si(OR^3)_3 \quad (1)$$

wherein $R^1$ is an alkyl group, an alkenyl group, a halogenoalkyl group, an aryl group, an aralkyl group or a halogenoaryl group; and $R^3$ is a hydrogen atom, an alkyl group or an acyl group, and partial hydrolyzates thereof, (B) a dispersion sol of metal oxide fine particles, (C) a curing agent, and (D) benzyl alcohol, said molded article being a cell-casting-molded article or continuous-casting-molded article, and said acrylic resin being a polymer composed mainly of methyl methacrylate.

2. The coating composition according to claim 1, further comprising (E) a medium other than benzyl alcohol for dissolving or dispersing the silicon compound (A), dispersion sol (B) and curing agent (C).

3. The coating composition according to claim 2, wherein the amount of medium (E) other than benzyl alcohol is 1 to 89 parts by weight per 100 parts by weight of the coating composition.

4. The coating composition according to claim 1, further comprising (F) an acid catalyst and water.

5. The coating composition according to claim 4, wherein the amount of water is 0.5 to 5 moles per mole of silicon compound (A).

6. The coating composition according to claim 1, wherein the weight ratio of silicon compound (A) to dispersion sol (B) is 8/2 to 3/7.

7. The coating composition according to claim 1, wherein the total weight of silicon compound (A) and dispersion sol (B) is 5 to 70 parts by weight per 100 parts by weight of the coating composition.

8. The coating composition according to claim 1, wherein the amount of curing agent (C) is 0.3 to 10 parts by weight per 100 parts by weight of the total of silicon compound (A) and dispersion sol (B).

9. The coating composition according to claim 1, wherein the amount of benzyl alcohol (D) is 2 to 35 parts by weight per 100 parts by weight of the coating composition.

10. A process for producing a molded article of acrylic resin having an abrasion-resistant film thereon, which comprises applying a coating composition set forth in any of claims 4 to 5, 1 and 2 on at least part of the surface of a molded article of acrylic resin to form a wet film and then drying and curing the wet film.

* * * * *